United States Patent
Funayose et al.

(10) Patent No.: US 7,299,128 B2
(45) Date of Patent: Nov. 20, 2007

(54) VEHICLE NAVIGATION SYSTEM

(75) Inventors: Yusuke Funayose, Saitama (JP);
Kunihiko Fukui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 303 days.

(21) Appl. No.: 10/891,137

(22) Filed: Jul. 15, 2004

(65) Prior Publication Data

US 2005/0027451 A1 Feb. 3, 2005

(30) Foreign Application Priority Data

Jul. 24, 2003 (JP) .............................. 2003-201054

(51) Int. Cl.
*G01C 21/00* (2006.01)
(52) U.S. Cl. .................. 701/213; 340/888; 340/995.1; 340/988; 701/117
(58) Field of Classification Search ................ 340/905, 340/995.13, 988–989; 701/200, 117, 20; 455/507
See application file for complete search history.

(56) References Cited

U.S. PATENT DOCUMENTS

| | | | |
|---|---|---|---|
| 5,699,056 A * | 12/1997 | Yoshida | 340/905 |
| 5,911,773 A * | 6/1999 | Mutsuga et al. | 701/200 |
| 5,928,294 A * | 7/1999 | Zelinkovsky | 701/24 |
| 6,131,064 A * | 10/2000 | Vieweg | 701/117 |
| 6,269,306 B1 | 7/2001 | Ibrahim et al. | |
| 6,359,571 B1 * | 3/2002 | Endo et al. | 340/988 |
| 6,480,783 B1 * | 11/2002 | Myr | 701/117 |
| 6,650,252 B2 * | 11/2003 | Miller, Jr. | 340/989 |
| 6,710,739 B1 * | 3/2004 | Loegering | 342/357.12 |
| 7,096,115 B1 * | 8/2006 | Groth et al. | 701/117 |

(Continued)

FOREIGN PATENT DOCUMENTS

AU 2004203012 A1 * 2/2005

(Continued)

OTHER PUBLICATIONS

Groth, E., McGrath, S., McGrath, T., Mbekeani, L., U.S. Appl. No. 10/123,587, filed Apr. 16, 2002, entitled: Method and System for Using Real-Time Traffic Broadcasts with Navigation Systems. cited by other.*

(Continued)

*Primary Examiner*—Cuong Nguyen
(74) *Attorney, Agent, or Firm*—Birch, Stewart, Kolasch & Birch, LLP (57) ABSTRACT

To provide a vehicle navigation system that can accurately display a position of a vehicle that has the navigation system mounted thereon and a target direction even when the vehicle is stopped or traveling at low speed. The vehicle navigation system includes a device that senses a traveling state of a vehicle, a device that judges whether or not the vehicle is stopped or traveling at a low speed, and a device that smoothes GPS positioning data so that error components contained in the GPS positioning data are canceled out or compensated for when the vehicle is stopped or traveling at a low speed. The navigation system further includes a device that calculates the current position based on the smoothed GPS positioning data. The smoothing device outputs new positioning data, for example, based on current GPS positioning data and previous GPS positioning data.

18 Claims, 6 Drawing Sheets

U.S. PATENT DOCUMENTS

| | | | |
|---|---|---|---|
| 7,139,659 B2 * | 11/2006 | Mbekeani et al. | 701/117 |
| 7,176,813 B2 * | 2/2007 | Kawamata et al. | 340/995.13 |
| 2003/0135327 A1 | 7/2003 | Levine et al. | |
| 2005/0027451 A1 * | 2/2005 | Funayose et al. | 701/213 |

FOREIGN PATENT DOCUMENTS

| | | | |
|---|---|---|---|
| CA | 2472508 A1 | | 12/2004 |
| CN | 1576791 A | * | 2/2005 |
| JP | 63-238479 A | | 10/1988 |
| JP | 10-290761 | * | 10/1998 |
| JP | 10-290762 | * | 10/1998 |
| WO | WO-97/24584 A1 | | 7/1997 |

OTHER PUBLICATIONS

Proceedings of the Vehicular Technology Conference Article entitled "Monitoring A Metropolitan Freeway System Using Probe Vehicles and Random Access Radio Channel" written by Jean-Paul M.G. Linnartz, et al., publication date Jun. 8, 1994, pp. 410-414.*

Proceedings of the Vehicle Navigation and Information Systems Conference. (VNIS); Individual Comm. Function of RAC: Road Automobile Comm. Sys.; Fukui, et al.; Toronto, Canada; Sep. 11-13, 1989; pp. 206-213.*

\* cited by examiner

| WP NUMBER | POSITIONAL INFORMATION | |
|---|---|---|
| 1 | N 35.40.09.00 | E 139.43.37.5 |
| 2 | . . . . . . . . . . . . . . . . . . . . . . . . . . . | |
| 3 | . . . . . . . . . . . . . . . . . . . . . . . . . . . | |
| 4 | . . . . . . . . . . . . . . . . . . . . . . . . . . . | |
| ⋮ | ⋮ | |
| 9 | . . . . . . . . . . . . . . . . . . . . . . . . . . . | |

VEHICLE NAVIGATION SYSTEM

CROSS-REFERENCE TO RELATED APPLICATIONS

This nonprovisional application claims priority under 35 U.S.C. § 119(a) on Patent Application No. 2003-201054, filed in Japan on Jul. 24, 2003, the entirety of which is incorporated herein by reference.

BACKGROUND OF THE INVENTION

1. Field of the Invention

The present invention relates to a vehicle navigation system. Specifically, the present invention relates to a vehicle navigation system, which receives radio waves from satellites and recognizes a current position of a vehicle that has the navigation system mounted thereon.

2. Description of Background Art

A GPS navigation system utilizing an artificial satellite has hitherto been used as a navigation system for various mobile bodies such as automobiles, airplanes, and ships. A GPS receiver used in this GPS navigation system is configured to receive radio waves from a plurality of GPS satellites, measure a receiving point from data of a pseudorange between each of the GPS satellites and the receiving point and a position data of each GPS satellite, and output GPS positioning data. Herein, the pseudorange contains a time offset of the receiver. However, the GPS positioning accuracy includes error components because of the following reasons:

(1). The accuracy is reduced because of an error occurring while radio waves pass through the ionosphere.

(2). The accuracy is reduced because of a multipath phenomenon in which signal radio waves from the satellites are mixed with components of signals reflected from the ground, buildings, mountains, and the like. The accuracy changes with time as the state of such obstacles changes with time.

Figure 8:
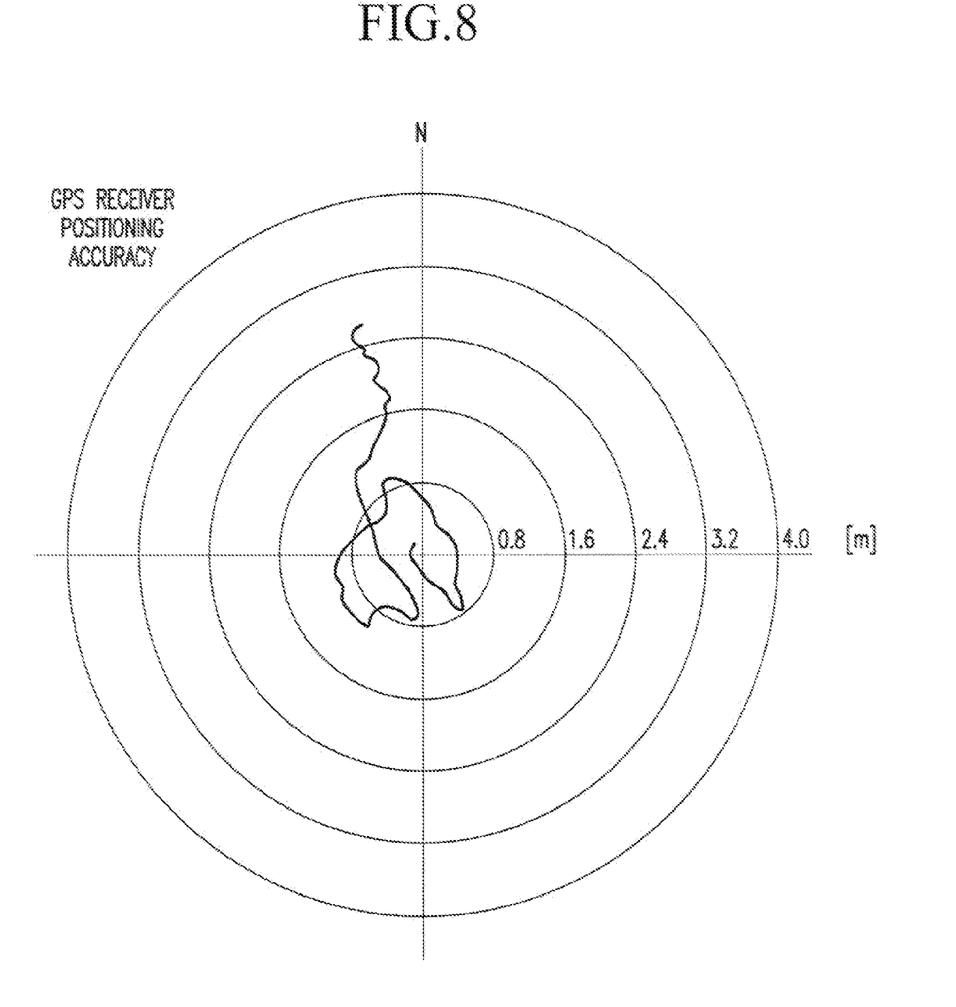
FIG. 8 is a view showing temporal transition of a current position obtained by GPS positioning calculation while a vehicle is stopped.

Therefore, a simple navigation system with no autonomous navigation unit mounted thereon includes a technical problem in that a pointer on a screen indicating a current position of a vehicle that has the navigation system mounted thereon moves while the vehicle is stopped. FIG. 8 is a view showing a temporal transition of the current position obtained by GPS positioning calculation while a vehicle is stopped.

In order to overcome the above technical problem, Japanese Patent Laid-Open publication No. 63-238479 discloses a technique that prevents the current position indicator from moving while the vehicle is stopped. In this technique, current position information obtained by GPS positioning means is ignored when vehicle stop detecting means detects that the vehicle is stopped.

However, the aforementioned disadvantage due to the GPS positioning error can also occur while the vehicle is traveling at a low speed in a traffic jam or the like as well as while the vehicle is stopped. Therefore, if the current position information is ignored only when it is detected that the vehicle is stopped, wrong position information is displayed while the vehicle is traveling at low speed.

If the aforementioned technique according to the background art is not only applied to the time when the vehicle is stopped but also extended to the time when the vehicle is traveling at low speed, a technical problem occurs in that the last determined current position greatly differs from the actual current position if the vehicle continues to travel at a low speed.

SUMMARY OF THE INVENTION

An object of the present invention is to solve the aforementioned problems of the background art and to provide a vehicle navigation system which can accurately recognize the position and the target direction of a vehicle that has the navigation system mounted thereon even while the vehicle is stopped or traveling at low speed.

In order to achieve the aforementioned object, the present invention is directed to a vehicle navigation system that executes GPS positioning calculation based on radio waves transmitted from a plurality of GPS satellites to obtain a current position based on positioning data. The vehicle navigation system includes: means for sensing a traveling state of a vehicle; means for judging based on a result of the sensing whether a travel speed of the vehicle is less than a reference speed; means for smoothing GPS positioning data when the travel speed is judged to be less than the reference speed; and means for calculating the current position based on the smoothed GPS positioning data.

According to the aforementioned aspect, while the vehicle is stopped or traveling at a low speed, at the time when errors of the GPS positioning data have a great affect on the display of the current position, the GPS positioning data is smoothed, and error components are canceled out or compensated. Therefore, the current position can be accurately recognized.

Moreover, the current position can be recognized even when the vehicle is traveling at low speed, and the GPS positioning calculation is being executed. Accordingly, it is possible to obtain guidance information even when the vehicle is forced to travel at a low speed when the vehicle is stuck in a traffic jam or the like.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF HE PREFERRED EMBODIMENTS

Figure 1:
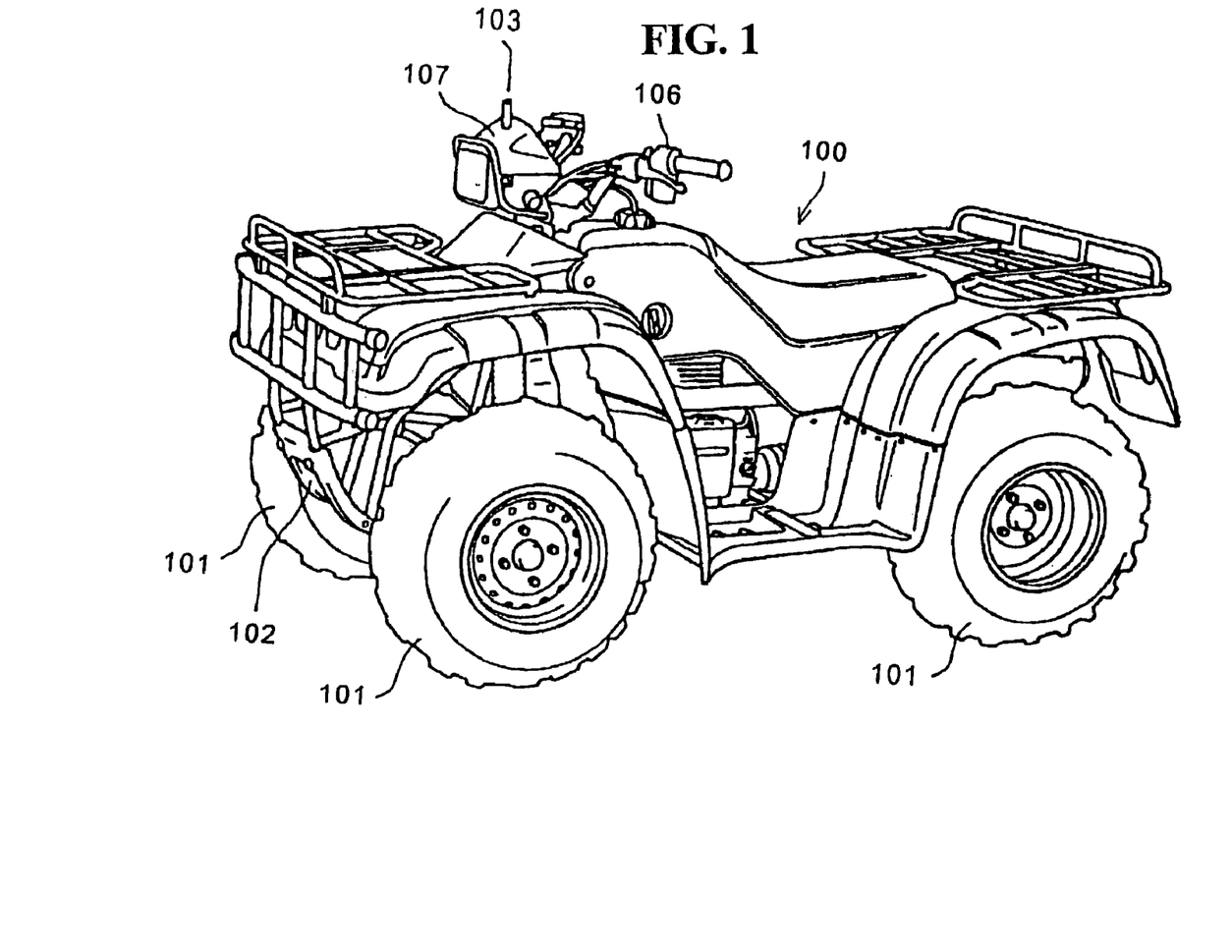
FIG. 1 is a perspective view showing a saddle-type buggy for rough terrain on which a vehicle navigation system of the present invention is mounted.

The present invention will now be described with reference to the accompanying drawings, wherein the same reference numerals have been used to identify the same or similar elements. FIG. 1 is a perspective view showing a saddle type buggy 100 for rough terrain on which a vehicle navigation system of the present invention is mounted.

The buggy 100 of the present invention offers hill-climbing ability and off-road ability by using large-diameter wheels 101, an under cover 102, a four-wheel drive mechanism, and the like. A meter unit 107 is provided in the center of a handle 106. A helical-type or patch-type GPS receiver antenna 103 points toward the sky on the upper part of the meter unit 107. The saddle-type buggy 100 is frequently used in rough terrain where the attitude of the traveling vehicle largely changes. However, if a helical antenna with low directivity is used, such as the receiver antenna 103, GPS radio waves can be well received irrespective of the changes in the attitude of the vehicle.

Although the present invention has been illustrated in FIG. 1 as being mounted to a four wheeled saddle-type buggy 100, it should be recognized that the present invention could also be applied to other mobile bodies as well. For example, the present invention can be mounted on airplanes, ships, etc. In addition, the present invention can be mounted on two, three and four wheeled vehicles other that the four wheeled saddle-type buggy 100.

Figure 2:
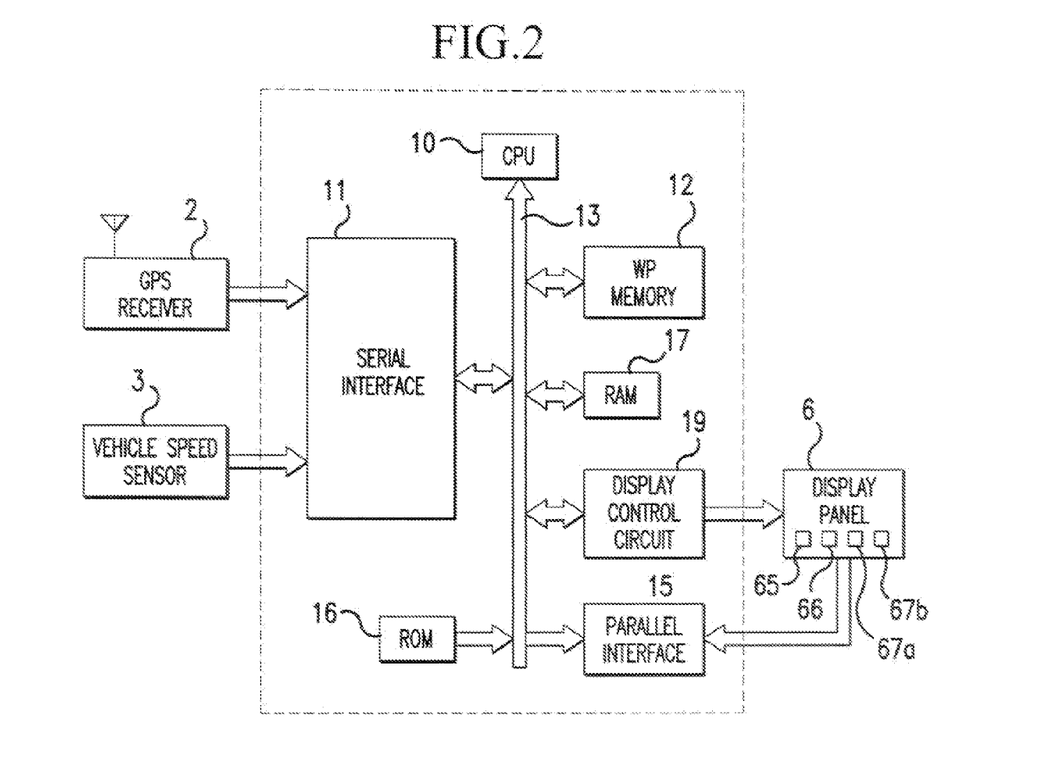
FIG. 2 is a block diagram showing a configuration of a main portion of the vehicle navigation system according to the present invention.

FIG. 2 is a block diagram showing a configuration of a main portion of a navigation system 1 mounted on the buggy 100. The navigation system is a simple type navigation system, which does not include an autonomous navigation system mounted thereon. The navigation system calculates the current position of the buggy 100 based on GPS positioning data.

A GPS receiver 2 periodically receives GPS signals transmitted from a plurality of artificial satellites. A vehicle speed sensor 3 senses a travel speed of the vehicle that has the navigation system 1 mounted thereon based on the number of revolutions of the vehicle wheels. However, in the case of an airplane, for example, the vehicle speed sensor 3 could sense the travel speed in a different way, as long as the actual vehicle speed is determined. The GPS receiver 2 and the vehicle speed sensor 3 are connected to a system bus 13 with a serial interface 11 interposed therebetween.

A CPU 10 calculates the current position (latitude and longitude) of the vehicle that has the navigation system mounted thereon and the current time based on a plurality of GPS signals received by the GPS receiver 2. The CPU 10 also determines the travel direction based on a history of the current position information and the information acquired from the vehicle speed sensor 3. The CPU 10 further calculates a relative positional relationship between a way point (WP), which is already registered in a way point (WP) memory 12, and a current position of the vehicle. A RAM 17 offers a work area for the CPU 10.

A display control circuit 19 outputs the direction and the distance of the WP from the current position and the like to a display panel 6 of the meter unit 107. Switches 65, 66, 67a and 67b of the display panel 6 are individually connected to the system bus 13 with a parallel interface 15 interposed therebetween.

Figure 3:
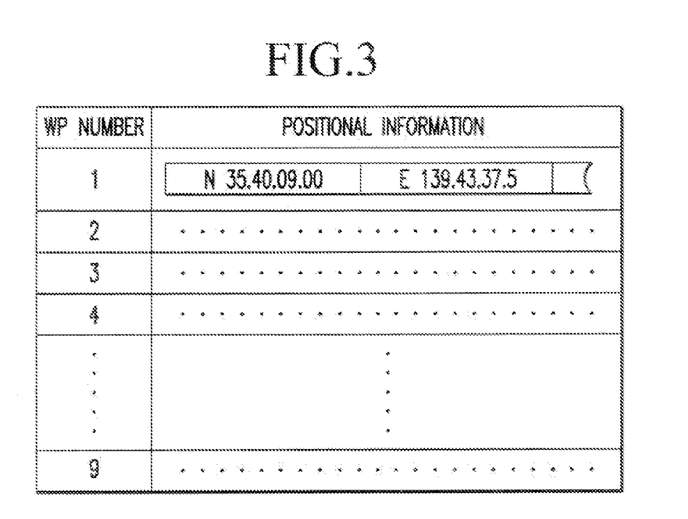
FIG. 3 is a view schematically expressing storage contents of a WP memory.

FIG. 3 is a view schematically expressing storage contents of the WP memory 12. Storage areas are reserved for respective WP numbers, which are information identifying WPs. Each of the storage areas stores the latitude and longitude of each WP as positional information of the WP.

Figure 4:
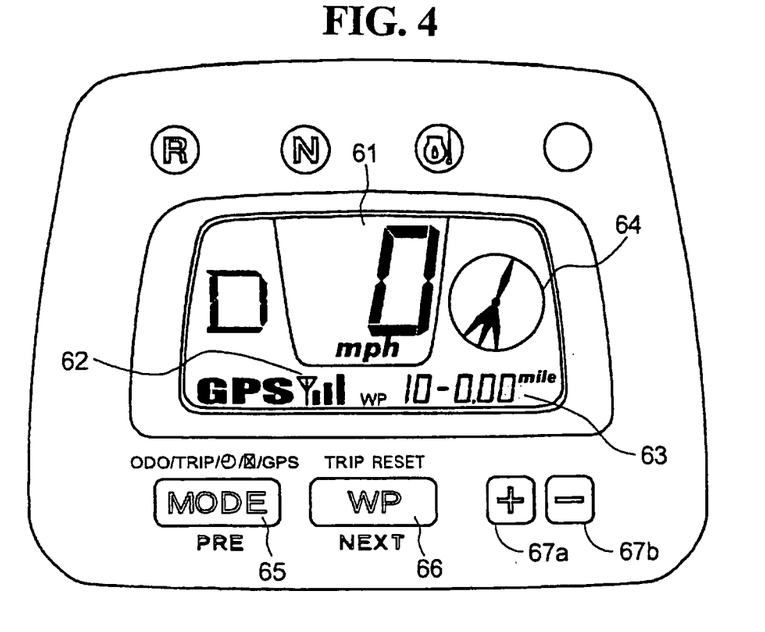
FIG. 4 is a view showing a display example (NAVI mode) of a display panel.
Figure 5:
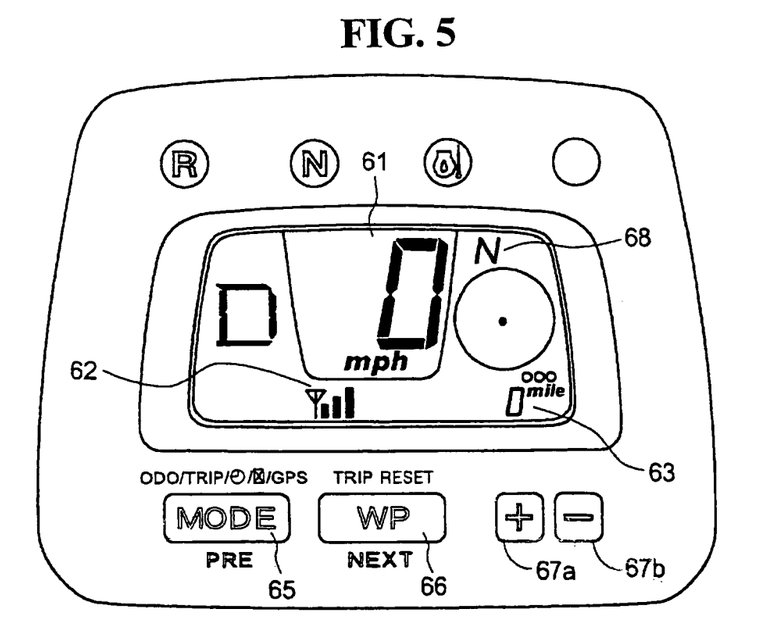
FIG. 5 is a view showing a display example (compass mode) of the display panel.

FIGS. 4 and 5 are views showing display examples of the display panel 6. The same reference numerals as those described above denote the same or similar elements.

The navigation system of the embodiment is provided with a "NAVI mode" that indicates the direction of a WP or the final destination with each of 16 segments and a "compass mode" indicating a bearing of the travel direction with each of eight segments.

In the NAVI mode, as shown in FIG. 4, a vehicle speed display area 61, a positioning state display area 62, and a direction display area 64 are displayed. In the positioning state display area 62, a GPS positioning state is displayed. In the direction display area 64, the direction of a WP or the final destination is indicated by an arrow with each of 16 segments. The number of a WP currently selected and a distance to the WP are displayed in a multi-display area 63.

In the compass mode, as shown in FIG. 5, the vehicle speed display area 61, the positioning state display area 62 where the GPS positioning state is displayed, and a compass display area 68 are displayed. In the compass display area 68, a current travel direction is indicated by each of eight segments (north [N]-northeast [NE]-east [E]-southeast [SE]-south [S]-southwest [SW]-west [W]-northwest [NW]). An odometer (ODD), a tripmeter (TRIP), elapsed time (HOUR), and the current time are selectively displayed in the multi-display area 63.

Figure 6:
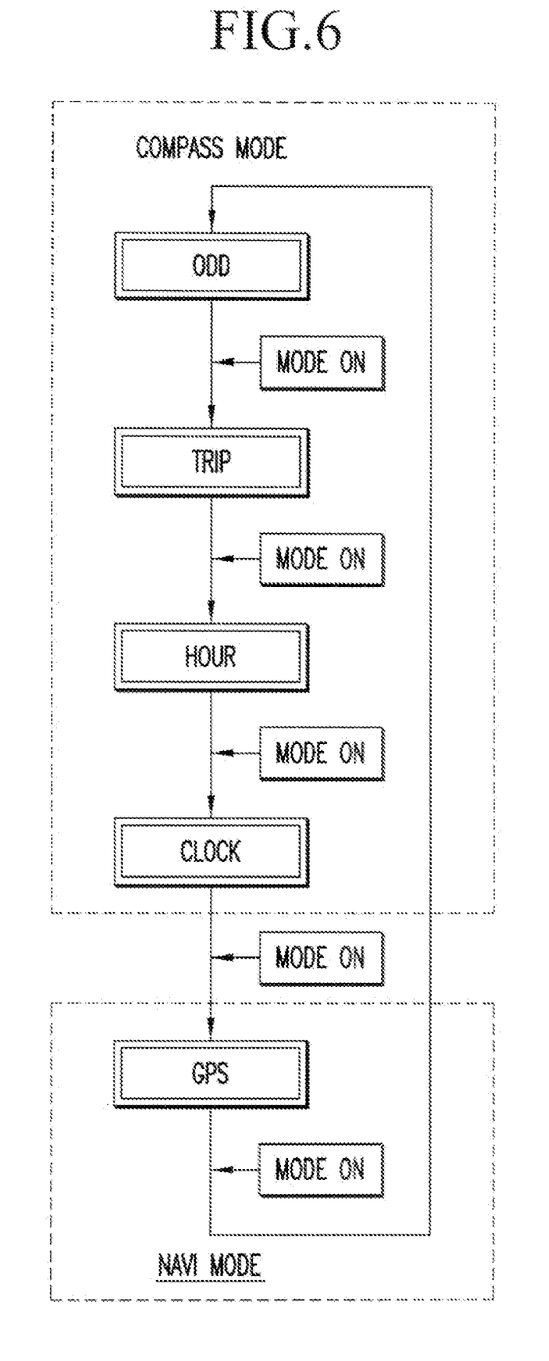
FIG. 6 is a view showing a state where the display examples of the display panel change in response to operations of a MODE switch.

FIG. 6 is a view showing a state where the display examples of the display panel 6 change in response to operations of the MODE switch 65. For example, when the MODE switch 65 is operated when the display is in the compass mode and the ODD is displayed, only the display in the multi-display area 63 is sequentially changed to TRIP display, to HOUR display, and to clock display while being in the compass mode. When the MODE switch 65 is further operated, the compass mode is changed to the NAVI mode. When the MODE switch 65 is operated in the NAVI mode, the display is returned to the ODD display state of the compass mode.

Figure 7:
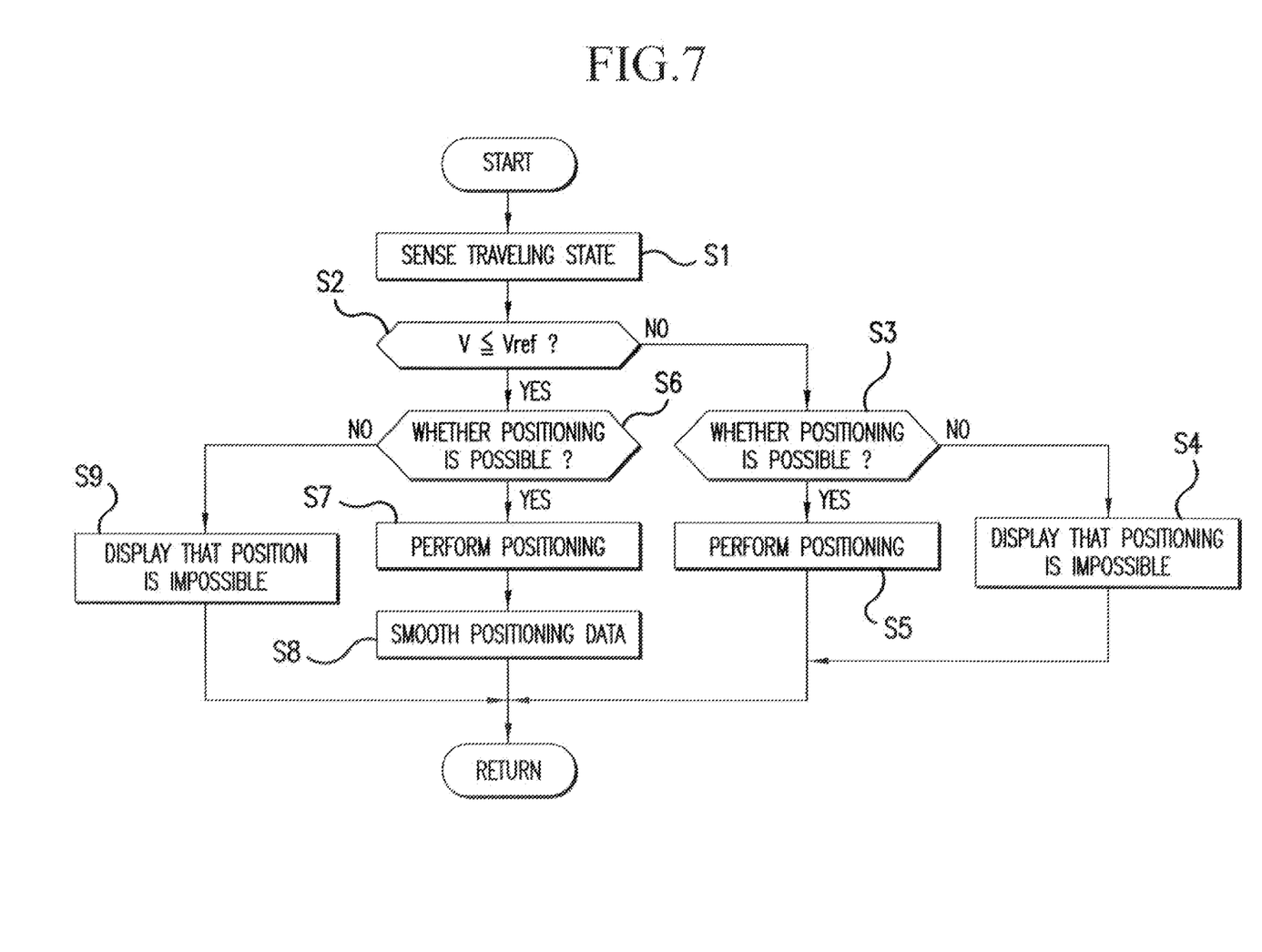
FIG. 7 is a flowchart showing an operation of the embodiment.

FIG. 7 is a flowchart showing a procedure for recognizing the current position in the embodiment, mainly showing a procedure of a process that the CPU 10 executes according to a control program stored in the ROM 16.

In step S1, the traveling state of the vehicle is sensed based on a pulse signal detected by the vehicle speed sensor 3. In step S2, it is judged based on the sensed traveling state whether the travel speed V of the vehicle is less than a reference speed Vref. When the travel speed V is more than the reference speed Vref, the procedure proceeds to step S3, and it is judged whether positioning based on the GPS signals is possible. When the vehicle is traveling in a tunnel or in a mountainous area and cannot receive any GPS signals, the procedure proceeds to step S4. In the step S4, a sign indicating that positioning is impossible is displayed in the positioning state display area 62. On the contrary, when it is judged that positioning is possible in the step S3, the procedure proceeds to step S5, and the current position is determined based on the GPS signals. This positioning data is used to calculate the travel direction in the compass mode and is used to display the direction to the destination with an arrow in the NAVI mode.

On the contrary, when the travel speed V is judged to be less than the reference speed Vref in the step S2, the procedure proceeds to step S6, and it is judged whether positioning based on the GPS signals is possible in the same manner as the step S3. When the positioning is impossible, the procedure proceeds to step S9, and the sign indicating the state where positioning is impossible is displayed in the positioning state display area 62 in the same manner as step S4.

On the contrary, when it is judged in the step S6 that the positioning is possible, the procedure proceeds to step S7, and the current position is determined based on the GPS signals. In step S8, the positioning data is filtered, and a smoothing process is then executed to reduce the effect thereof. In the embodiment, an average value of positioning data P obtained in previous positioning operations and current positioning data P0 is calculated as the positioning data. At this time, it is possible to employ a weighted average where priority is given to the previous positioning data P or to the current positioning data P0 and vice versa.

As described above, according to the embodiment, if the travel speed V is less than the reference speed Vref, as in the case where the vehicle is stopped or traveling at a low speed, the current position is calculated using previous positioning data P and current positioning data PO. In other words, the current position is calculated based on more than one positioning data of the positioning operation without employing only the current positioning data PO. Accordingly, the current position can be comparatively accurately calculated even if the positioning data contains an error. Therefore, in the compass mode, the display of the travel direction can be prevented from changing while the vehicle is stopped. In the NAVI mode, the display of the destination direction can be prevented from changing while the vehicle is stopped.

Furthermore, according to the embodiment, the current position can be recognized by executing the GPS positioning calculation even while the vehicle is traveling at a low speed. Accordingly, guidance is possible even when the vehicle is forced to travel at low speed when stuck in a traffic jam or the like.

According to the present invention, the following effects can be achieved.

(1). The GPS positioning data is smoothed so that error components are canceled out or compensated for while the vehicle is stopped or traveling at a low speed, at times when the errors of the GPS positioning data greatly affect the display of the current position. Accordingly, the current position can be accurately recognized.

(2). The current position can be recognized by executing the GPS positioning calculation even when the vehicle is traveling at low speed. Accordingly, guidance is possible even when the vehicle is forced to travel at low speed when stuck in a traffic jam or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle navigation system that executes a GPS positioning calculation based on radio waves transmitted from a plurality of GPS satellites to obtain a current position based on positioning data, the vehicle navigation system comprising:
   means for sensing a traveling speed of a vehicle;
   means for judging whether the traveling speed of the vehicle is greater than, less than or equal to a reference speed, based on a result of the sensing;
   means for averaging GPS positioning data when the traveling speed is judged to be less than or equal to the reference speed; and
   means for calculating the current position based on the averaged GPS positioning data.

2. The vehicle navigation system according to claim 1, wherein the averaging means averages the positioning data based on current GPS positioning data and previous GPS positioning data.

3. The vehicle navigation system according to claim 2, wherein the averaging means averages the positioning data by taking a weighted average of the current GPS positioning data and previous GPS positioning data so that priority is given to one of the previous positioning data and the current positioning data.

4. The vehicle navigation system according to claim 1, wherein when the means for judging judges that the traveling speed is greater than the reference speed, the means for calculating calculates the current position based on only current GPS positioning data.

5. The vehicle navigation system according to claim 2, wherein when the means for judging judges that the traveling speed is greater than the reference speed, the means for calculating calculates the current position based on only the current GPS positioning data.

6. The vehicle navigation system according to claim 3, wherein when the means for judging judges that the traveling speed is greater than the reference speed, the means for calculating calculates the current position based on only the current GPS positioning data.

7. The vehicle navigation system according to claim 1, further comprising means for determining whether positioning is possible, and wherein the means for calculating only calculates the current position when the means for determining determines that positioning is possible.

8. The vehicle navigation system according to claim 2, further comprising means for determining whether positioning is possible, and wherein the means for calculating only calculates the current position when the means for determining determines that positioning is possible.

9. The vehicle navigation system according to claim 3, further comprising means for determining whether positioning is possible, and wherein the means for calculating only calculates the current position when the means for determining determines that positioning is possible.

10. A vehicle navigation system that executes a GPS positioning calculation based on radio waves transmitted from a plurality of GPS satellites to obtain a current position based on positioning data, the vehicle navigation system comprising:
    a sensor that senses a traveling speed of a vehicle;
    a judging device that judges whether the traveling speed of the vehicle is greater than, less than or equal to a reference speed, based on a result of the sensing;
    an averaging device that averages GPS positioning data when the traveling speed is judged to be less than or equal to the reference speed; and
    a calculating device that calculates the current position based on the averaged GPS positioning data.

11. The vehicle navigation system according to claim 10, wherein the averaging device averages the positioning data based on current GPS positioning data and previous GPS positioning data.

12. The vehicle navigation system according to claim 11, wherein the averaging device averages the positioning data by taking a weighted average of the current GPS positioning data and previous GPS positioning data so that priority is given to one of the previous positioning data and the current positioning data.

13. The vehicle navigation system according to claim 10, wherein when the judging device judges that the travel speed is greater than the reference speed, the calculating device calculates the current position based on only current GPS positioning data.

14. The vehicle navigation system according to claim 11, wherein when the judging device judges that the travel speed is greater than the reference speed, the calculating device calculates the current position based on only the current GPS positioning data.

15. The vehicle navigation system according to claim 12, wherein when the judging device judges that the travel speed is greater than the reference speed, the calculating device calculates the current position based on only the current GPS positioning data.

16. The vehicle navigation system according to claim 10, further comprising a device that determines whether positioning is possible, and wherein the calculating device only calculates the current position when the determining device determines that positioning is possible.

17. The vehicle navigation system according to claim 11, further comprising a device that determines whether positioning is possible, and wherein the calculating device only calculates the current position when the determining device determines that positioning is possible.

18. The vehicle navigation system according to claim 12, further comprising a device that determines whether positioning is possible, and wherein the calculating device only calculates the current position when the determining device determines that positioning is possible.

\* \* \* \* \*